United States Patent [19]

Bronicki

[11] Patent Number: 4,571,947

[45] Date of Patent: Feb. 25, 1986

[54] METHOD OF AND APPARATUS FOR TREATING THE WATER IN A SOLAR POND POWER PLANT

[75] Inventor: Lucien Y. Bronicki, Rehovot, Israel

[73] Assignee: Solmat Systems Ltd., Yavne, Israel

[21] Appl. No.: 611,393

[22] Filed: May 18, 1984

Related U.S. Application Data

[63] Continuation of Ser. No. 337,299, Jan. 5, 1982, abandoned.

[51] Int. Cl.⁴ ............................ F03G 7/02; F24J 3/02
[52] U.S. Cl. .................................. 60/641.8; 126/415
[58] Field of Search ...................... 60/641.8; 126/415

[56] References Cited

U.S. PATENT DOCUMENTS

| | | | |
|---|---|---|---|
| 580,919 | 4/1897 | Woolf | 204/95 X |
| 1,235,202 | 7/1917 | Hartsuch | 204/130 |
| 2,400,439 | 5/1946 | Romans | 210/765 |
| 2,541,799 | 2/1951 | White | 210/765 |
| 3,223,242 | 12/1965 | Murray | 210/754 X |
| 3,351,542 | 11/1967 | Oldeshaw et al. | 210/754 X |
| 3,378,479 | 4/1968 | Colvin et al. | 210/169 X |
| 4,377,071 | 3/1983 | Assaf et al. | 126/415 X |

OTHER PUBLICATIONS

"Solar Ponds", by H. Tabor; Solar Energy, vol. 7, No. 4, 1963.

Primary Examiner—Allen M. Ostrager
Attorney, Agent, or Firm—Sandler & Greenblum

[57] ABSTRACT

Water in a solar pond power plant is chlorinated in order to help maintain the transparency of the wind-mixed layer, to suppress microbial activity at all levels of the pond, and to reduce fouling of the boiler which receives hot brine from the heat storage layer of the pond. In one aspect of the invention, chlorine is injected into the water in the wind-mixed layer, in the halocline, and/or in the heat storage layer. Injection into the wind-mixed layer and into the heat storage layer is possible by reason of the flow of this water outside the pond to supply the boiler and condenser of the power plant, thus providing accessibility to liquid chlorine treatment. The halocline is chlorinated by using vertically adjustable intake and discharge diffusers positioned in the halocline and exchanging the water in a stratum. In a second aspect of the invention, in-situ electrolysis is utilized for selectively chlorinating the pond at various levels or locations.

13 Claims, 2 Drawing Figures

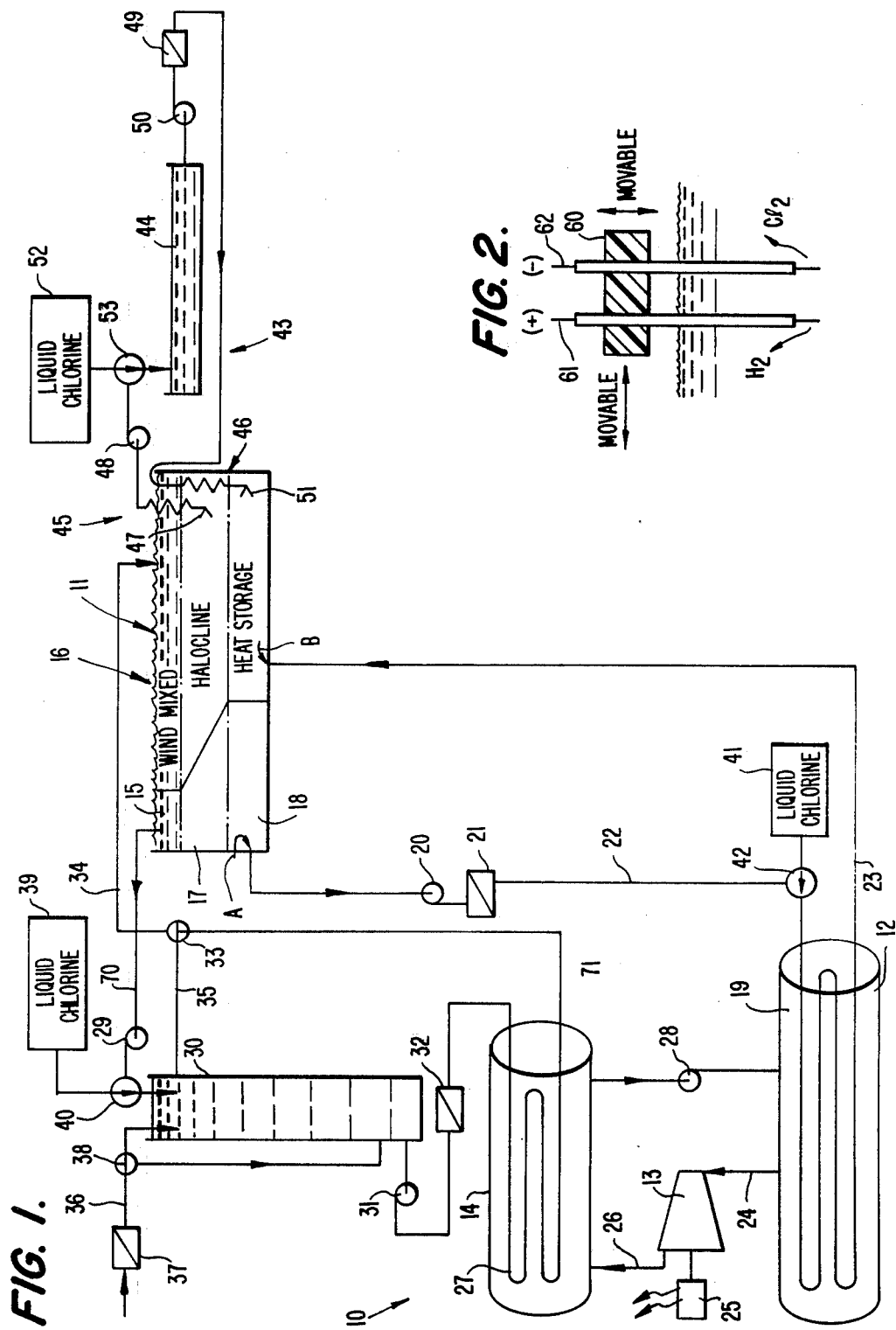

4,571,947

METHOD OF AND APPARATUS FOR TREATING THE WATER IN A SOLAR POND POWER PLANT

This application is a continuation of application Ser. No. 337,299, filed 1/5/1982, abandoned.

TECHNICAL FIELD

This invention relates to a method of and apparatus for treating the water in a solar pond power plant.

BACKGROUND ART

A solar pond power plant comprises two major elements: a solar pond for collecting and storing solar radiation incident on the pond, and a power plant that utilizes a low-temperature turbogenerator for converting heat extracted from the pond into electricity.

One form of solar pond comprises an upper, convective wind-mixed layer of from 3–5% salinity exposed to solar radiation, a non-convective intermediate halocline whose salinity increases with depth to a maximum of about 25–30% salinity for absorbing heat from solar radiation passing through the wind-mixed layer, and a lower heat storage layer of 25–30% uniform salinity. In Southern California and comparable latitudes, the heat transferred by conduction to the heat storage layer averages about 40 watts/m$^2$ (on a 24-hour, yearly basis) so that a 60-acre pond is adequate to provide heat for a power plant capable of producing 5 MW peak power about four hours per day. If the heat storage layer were to reach a temperature of 80° C., the heat storage layer would be from 2–3 m deep. The wind-mixed layer is from 20–50 cm, depending on weather conditions and the efficiency of windbreaks at the surface, and the halocline is about 1–1.5 m.

A suitable low-temperature turbogenerator for a solar pond power plant comprises an organic working fluid Rankine-cycle turbine that drives a generator. The power plant itself includes a boiler in the form of a heat exchanger through which hot brine from the heat storage layer is pumped, the cooled brine being returned to the heat storage layer at a point isolated from the point at which the brine is drawn into the boiler. The heat exchanger contains an organic working fluid, such as Freon or other similar fluid, which is vaporized by the hot brine in the heat exchanger; and the vaporized working fluid is supplied to a turbine within which the vaporized working fluid expands, driving a generator coupled to the turbine for generating electricity. The working fluid exhausted from the turbine is then directed to a condenser, where the working fluid is condensed and returned by pump to the heat exchanger, thus completing the working fluid cycle.

In one arrangement, the condenser is cooled by water drawn from the wind-mixed layer, the warmed water produced by the condenser being returned to the surface of the pond where the heat absorbed in the condenser is dissipated to the atmosphere. Other arrangements for the condenser are also possible, of course, where cooling water other than the pond is available.

Proper and long-term operation of a solar pond of the type described above will depend upon the degree to which the wind-mixed layer, and to a lesser extent the halocline, remain transparent to solar radiation, on the suppression of microbial activity at all levels, particularly activity that produces blooms that create internal shadows and interfere with the absorption of solar radiation, and on the extent to which the heat exchangers that act as boiler and condenser are fouled by the brine solutions being pumped therethrough.

It is, therefore, an object of the present invention to provide a method of and apparatus for treating the water of a solar power plant of the type described above such that proper and long-term operation can be achieved with a minimum of disruption to the pond.

DISCLOSURE OF INVENTION

According to the present invention, the pond water is chlorinated. Chlorination of the water may take place during an exchange between the pond and the heat exchanger. In such case, and with regard to the water drawn from the heat storage layer and provided to the boiler, chlorination can take place either before or after the boiler, by injecting liquid or gaseous chlorine into the hot brine either just before the brine enters or after it leaves the heat exchanger. This may have the beneficial result of reducing fouling of the heat exchangers and, at the same time, introducing chlorine into the heat storage layer in a way that does not disturb the non-convective halocline located above the heat storage layer. Thus, fouling of the boiler may be suppressed, as well as microbial activity in the heat storage layer or at the interface between the heat storage layer and the ground.

In situations where the cooling water for the condenser of the power plant is derived from the wind-mixed layer of the solar pond, chlorination of this layer can be achieved by injecting chlorine into the cooling water before it enters or after it leaves the condenser. Inasmuch as water is being pumped from and then into the wind-mixed layer, the introduction of chlorine external to the pond has the advantage of chlorinating this layer without disturbing the halocline, which must remain non-convective.

In another aspect of the present invention, chlorination of the pond water can be carried out by in-situ electrolysis of the water. Preferably, although not necessarily, the situs of the electrolysis is the pond itself, although the presence of a brine solution throughout both the boiler and the condenser circuits permits localized in-situ chlorination to be carried out by electrolysis. This has the advantage of eliminating the need for transporting liquid chlorine to a remote solar pond power plant. A small amount of electrical energy generated by the turbine could be utilized for this electrolysis operation.

When the situs of the electrolysis is the pond itself, a pair of electrodes may be lowered into the pond without disturbing the non-convective nature of the halocline. As is well known, the application of direct current to these electrodes will cause hydrogen gas to be evolved at the anode, while chlorine gas is evolved at the cathode. By controlling the rate of current supplied to these electrodes, the rate at which the evolution of gas occurs can be controlled to a point where the gases remain dissolved in the brine and do not create bubbles that would disturb the stability of the pond. Furthermore, by providing for the electrodes to be movable, a predetermined volume of the pond can be chlorinated. That is to say, the electrodes can be movable parallel to the surface of the pond as well as vertically.

BRIEF DESCRIPTION OF DRAWINGS

An embodiment of the invention is disclosed in the accompanying drawing, wherein:

FIG. 1 is a schematic flow diagram of a solar pond power plant; and

FIG. 2 is a schematic showing of movable electrodes for carrying out in-situ chlorination of the pond water.

DETAILED DESCRIPTION

Referring now to FIG. 1, reference numeral 10 designates a solar power plant of the type described above comprising solar pond 11, boiler 12, turbine 13, and condenser 14. Pond 11 has a three-layer regime: an upper, convective, wind-mixed layer 15 of relatively low, uniform salinity (e.g., 3–5%) for receiving solar radiation 16, intermediate, non-convective halocline 17 having a downwardly directed salinity gradient with a maximum salinity at the bottom in the vicinity of 25–30% for absorbing solar radiation that penetrates the wind-mixed layer; and lower heat storage layer 18 of 25–30% uniform salinity for absorbing heat by conduction across the interface between the halocline and the heat storage layer. That is to say, solar radiation penetrating the wind-mixed layer and absorbed therein serves to locally heat the wind-mixed layer, causing convection currents which transfer the warmer, lighter water in the wind-mixed layer to the surface, where the heat is lost to the atmosphere. Radiation penetrating through the wind-mixed layer and absorbed in the halocline heats the halocline, but the inverse density gradient established by the salinity profile in the halocline prevents convection currents. Therefore, the temperature profile of the pond will match the salinity profile. After a period of time depending upon the latitude of the pond, a steady-state condition is reached at which the temperature may reach almost 100° throughout the heat storage layer.

Boiler 12 of the power plant is a heat exchanger to which hot brine is applied via coils 19 for vaporizing an organic working fluid, such as Freon or similar material within the boiler. Hot brine is taken from the heat storage layer of the pond at point A by pump 20; and after the brine is passed through filter 21, conduit 22 conveys the brine to the inlet side of coils 19. After passing through the boiler and vaporizing the organic working fluid therein, the cooled brine exits the boiler through conduit 23 and is returned to the pond at point B, which is sufficiently far away from point A so that the return flow of cooled brine does not adversely affect the brine flowing into the boiler.

Vaporized working fluid produced by boiler 12 is applied by conduit 24 to the inlet of turbine 13, where the vaporized working fluid expands, causing the turbine to drive generator 25 which produces electricity. After being exhausted from turbine 13, the vaporized working fluid is transferred by conduit 26 to the inlet of condenser 14. Cooling water passing through coils 27 of the condenser causes the working fluid to condense into a liquid, which is pumped by pump 28 back into boiler 12 for repeating the cycle.

The cooling water for condenser 14 can be derived from a conventional source of cool water such as a flowing river or a fixed body of water associated with cooling towers; or, the wind-mixed layer of the pond can be utilized as the source of cooling water. The latter arrangement is shown in FIG. 1, wherein water from the wind-mixed layer is drawn through conduit 70 by pump 29 into cooling pond 30, which acts as an accumulator as described below. The coldest water in the system is drawn by pump 31 through filter 32 and delivered to the inlet side of the coils 27 in condenser 14. The warmed cooling water exits the condenser through conduit 71 and is applied to control valve 33, which returns the water via conduit 34 to the cooling pond or via conduit 35 to the wind-mixed layer.

During the nighttime, when ambient temperature is lowest, the wind-mixed layer is cooled and water from this layer is pumped into the cooling pond so that by daylight the coolest water in the system will be contained in pond 30. At this point, the operation of pump 29 is terminated, and valve 33 is operated so that the discharge of water from condenser 14 will be applied to the cooling pond. Later in the day, when the water in the cooling pond reaches a predetermined level, valve 33 is switched to discharge the water exiting the condenser directly into the wind-mixed layer, while water in the cooling pond is replenished by operating pump 29.

Make-up water to replace water evaporated from the pond is provided by inlet line 36, which applies the make-up water through filter 37 and valve 38 to the cooling pond.

In order to chlorinate the water in the pond, separate steps may be taken in the three regimes of the pond. These separate steps are needed because the water in the wind-mixed layer is separate from and does not interchange with the water in the halocline located below this layer. Similarly, the water in the heat storage layer does not interchange with the halocline located above this layer.

In order to chlorinate the water in the wind-mixed layer, liquid chlorine in tank 39 may be injected into the water entering cooling pond 30 at metering valve 40. Due to the exchange of water between the wind-mixed layer in pond 11 and the water in pond 30, chlorination of this layer can be achieved within one day using tank 39. Thus, chlorination can be carried out either continuously or on an as-needed basis in accordance with the turbidity or other parameters associated with the wind-mixed layer.

In order to introduce chlorine into the heat storage layer, chlorine may be injected from tank 41 through metering valve 42 into the inlet conduit 22 connected to coils 19 in boiler 12. This chlorination can be carried out continuously if necessary, or intermittently as needed. Alternatively, chlorine can be introduced into conduit 23.

In order to chlorinate halocline 17, which is a non-convective layer whose stability should not be perturbed, the mechanism indicated by reference numeral 43 can be used. Mechanism 43, which exchanges one stratum of liquid at a time in the halocline, comprises auxiliary pond 44, which also acts as a settling pond for large-size particles in the halocline, intake means 45, discharge means 46, and associated water transport means. Intake means 45 includes intake diffuser 47, whose level in the halocline is selectively controlled by a suitable lifting arrangement (not shown) and pump 48, by which water of a given salinity (i.e., from a given depth) from a preselected layer in the halocline is drawn from the halocline and discharged into pond 44. The pumping process is a slow one to minimize turbulence in the halocline; and heavy particles in the water drawn from pond 11 settle in pond 44. The remainder of particulate material in the water is removed by filter 49, through which return pump 50 transfers water from auxiliary pond 44 to discharge means 46. The latter includes discharge diffuser 51, whose level is adjusted to match the level of the intake diffuser, but is spatially displaced in order to isolate one diffuser from the other. Chlorine from tank 52 is injected by metering valve 53 into the water discharged into pond 44. In this manner, each stratum in the halocline can be chlorinated as particulate matter is removed from the stratum.

By operating the pumps 48 and 50 for a period of time adequate to completely withdraw and replace a preselected layer of water in the halocline determined by the depth of the intake and discharge diffusers, particulate matter suspended in such layer can be filtered and removed, while at the same time the preselected layer can be chlorinated. By following this procedure, the entire halocline can be filtered and chlorinated, layer by layer.

The above-described procedure for chlorinating the various independent regimes of a solar pond by introducing chlorine into the water can also be achieved by in-situ electrolysis of the pond water. For this purpose, movable electrode support 60 is provided. This support, which is suspended in the pond by a suitable lifting arrangement (not shown) carries two electrodes, namely, anode 61 and cathode 62, which may be insulated except at their free ends. As shown in FIG. 2, the electrodes extend into the pond to a suitable level where the in-situ chlorination is to be carried out. As is well known, the passage of a direct current through the electrodes will result in a cathode reaction in which two electrons will combine with two molecules of water to form hydrogen gas and two hydroxyl ions. At the anode, two chlorine ions from the dissolved salt will be converted into chlorine gas, producing two electrons. By controlling the level of current flow into the electrodes, the rate at which the hydrogen and chlorine gases are evolved can be controlled. Preferably, the rate of evolution is relatively small, so that the gases evolved at the electrode tips will dissolve in the water in the region surrounding the electrodes before significant bubbles are produced.

The arrangement shown in FIG. 2 can be utilized for in-situ chlorinating each of the three regimes of the solar pond, but finds its most efficient use in chlorinating the halocline, inasmuch as chlorination can be carried out without disturbing the non-convecting nature of the halocline. The use of chlorine tanks 39 and 41 are more efficiently utilized for chlorinating the wind-mixed layer and the heat storage layer, respectively, if it is possible to provide liquid chlorine to the location of the solar pond. In the absence of having liquid chlorine available, the arrangement shown in FIG. 2 could be utilized for in-situ chlorination of any portion of the pond on an as-needed basis. That is to say, it is possible that localized blooms of microbial activity will occur in certain portions of the pond, and the arrangement shown in FIG. 2 can be used to locally chlorinate such areas for the purpose of destroying the microbial activity.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. A method for treating the water in a solar pond power plant of the type comprising: a solar pond that has a stratified halocline interposed between an upper wind-mixed layer that receives solar radiation and a lower heat storage layer that absorbs heat from the solar radiation; a boiler through which brine from the heat storage layer is pumped for vaporizing an organic working fluid; a turbine through which the vaporized working fluid is expanded for driving an electrical generator that generates electricity; and a condenser for condensing working fluid exhausted from the turbine and returning the condensate to the boiler, the method including the steps of chlorinating the pond water by introducing chlorine into the halocline at a predetermined level of the halocline without disturbing it.

2. A method according to claim 1 wherein chlorine is introduced into the pond by localized electrolysis.

3. A method according to claim 1 the chlorinating the pond water is achieved by in-situ electrolysis of pond water.

4. A method according to claim 3 wherein the situs of the electrolysis is the pond itself.

5. A method according to claim 4 wherein the depth at which electrolysis takes place is adjustable.

6. A method according to claim 1 wherein a stratum of the halocline is chlorinated by exchanging the water in the stratum and introducing chlorine into the exchanged water.

7. A method according to claim 6 wherein water from a stratum is pumped from the pond into an auxiliary pond before being returned to the stratum, the chlorine being introduced in the auxiliary pond.

8. A method according to claim 6 wherein the halocline is chlorinated stratum-by-stratum.

9. A solar pond comprising:
(a) an upper convective wind-mixed layer of relatively low, uniform salinity for receiving solar radiation;
(b) an intermediate, non-convective halocline having a downwardly directed salinity gradient for absorbing solar radiation;
(c) a lower heat storage layer of uniform salinity for absorbing heat by conduction from the halocline from the solar radiation; and
(d) moveable electrode means in the pond for in-situ electrolyzing the brine in the halocline and producing chlorine.

10. A solar pond according to claim 9 wherein the electrode means is vertically adjustable.

11. A solar pond comprising:
(a) an upper convective wind-mixed layer of relatively low, uniform salinity for receiving solar radiation;
(b) an intermediate, non-convective, stratified halocline having a downwardly directed salinity gradient for absorbing solar radiation;
(c) a lower heat storage layer of uniform salinity for absorbing heat by conduction from the halocline and from the solar radiation; and
(d) means for chlorinating the halocline without disturbing the stratification thereof during the chlorinization.

12. A solar pond according to claim 11 wherein said means for chlorinating includes a storage tank for receiving brine from the halocline, means for drawing brine from a preselected level of the halocline without disturbing its stratification and conducting the drawn brine to said storage tank, and means for adding chlorine to the brine in said storage tank.

13. A solar pond according to claim 12 wherein said means for drawing brine from a preselected level of the halocline includes a diffuser positioned at said preselected level, a conduit connecting the diffuser to said storage tank, and a pump for pumping brine through said conduit.

* * * * *

UNITED STATES PATENT AND TRADEMARK OFFICE
CERTIFICATE OF CORRECTION

PATENT NO. : 4,571,947

DATED : February 25, 1986

INVENTOR(S) : Lucien Y. BRONICKI

It is certified that error appears in the above-identified patent and that said Letters Patent is hereby corrected as shown below:

In Column 6, line 11, change "the" (first occurrence) to --wherein--.

Signed and Sealed this

Second Day of September 1986

[SEAL]

Attest:

DONALD J. QUIGG

Attesting Officer      Commissioner of Patents and Trademarks